April 18, 1967  TAKATO NIWA  3,314,846
EXPANSIBLE HOLLOW CORE
Filed July 11, 1961

INVENTOR.
BY TAKATO NIWA

AGENT 3,314,846
EXPANSIBLE HOLLOW CORE
Takato Niwa, 93 1-chome, Kibogaoka, Chigusa-ku, Nagoya, Japan
Filed July 11, 1961, Ser. No. 123,177
Claims priority, application Japan, July 26, 1960, 35/38,786; Sept. 28, 1960, 35/48,617, 35/48,618
4 Claims. (Cl. 161—69)

This invention relates to expansible hollow cores and, more particularly to expansible hollow cores for use as a buiding material assembled from a plurality of unit hollow cores by affixing foldable plate members to diaphragms to make a rigid assembly.

It is one of the objects of this invention to provide an expansible hollow core whose width in the folded state is smaller than that in the free state.

Another object of the invention is to provide an expansible hollow core wherein the width in the folded state can be adjusted so as to match the space in which the expansible hollow core is to be inserted.

A still further object of the invention is to provide an expansible hollow core which can be made of light materials so that the construction or installation is easier than with hollow cores of the conventional type.

Figure 1:
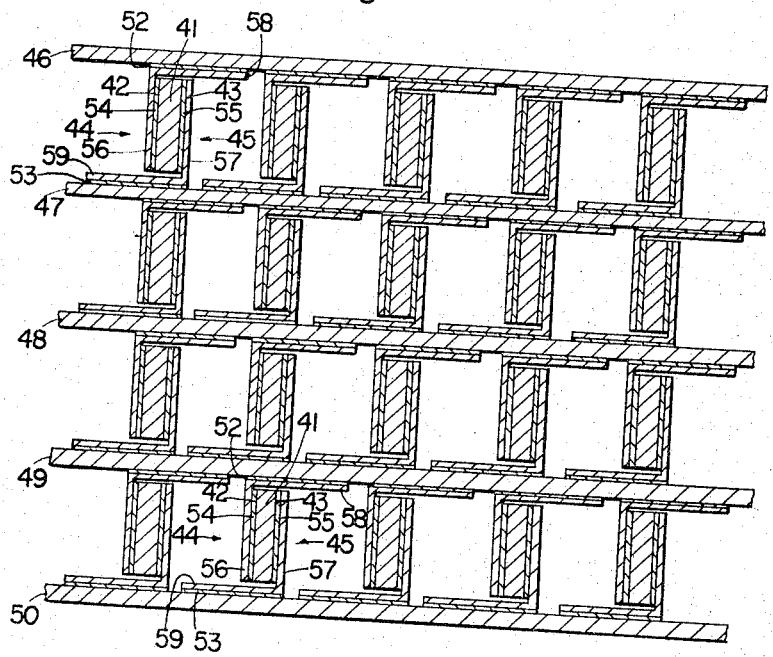
Figure 2:
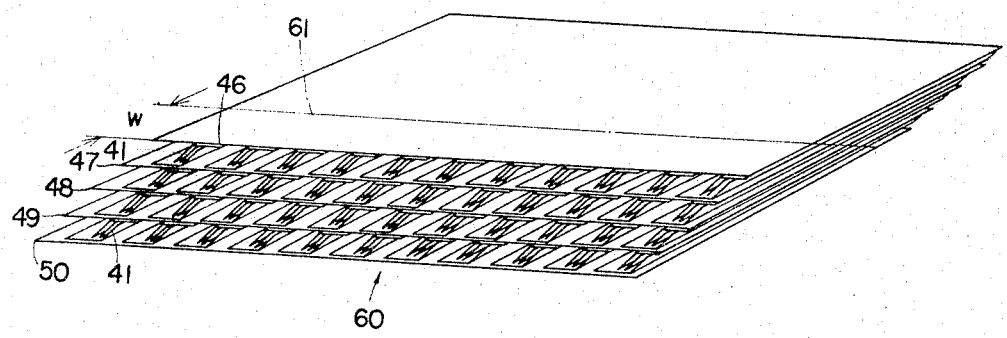

The objects of the invention will become apparent upon reading the following detailed description of the invention in conjunction with the accompanying drawings wherein:

FIG. 1 is a vertical cross sectional view of an expansible hollow core embodying the invention, and FIG. 2 is a schematic perspective view of the expansible hollow core shown in FIG. 1 which is in a folded state.

Referring to the drawing, flanks 42 and 43 of plate members 41, which are of rectangular shape and consist of relatively rigid slate, asbestos, rockwool, metal plate, synthetic resin, wood or gypsum board, are affixed to pieces 56 and 57 of junction members 44 and 45 by means of adhesive agents 54 and 55 respectively. Junction members 44 and 45 consist of paper, fibre or cloth which is pliable and easily foldable. Another piece 58 of junction member 44 is affixed to the underside of diaphragm 46 by means of adhesive agent 52 and another piece 59 of junction member 45 is affixed to the upperside of diaphragm 47, which is adjacent to said diaphragm 46, and is in the lowerside of diaphragm 46, by means of adhesive agent 52. Diaphragms are made of the same material as the plate members. Diaphragm 46 which is affixed by piece 58 of junction member 44 and diaphragm 47 which is affixed by piece 59 of same junction member 44 face with each other and form an assembly, with plate member 41 between pieces 58 and 59.

The folded state of plate member 46 is shown somewhat exaggerated in FIG. 2, the complete assembly 60 has scarcely no hollowness and being cut at W along line 61.

In using the complete hollow core assembly, diaphragm 46 in the uppermost layer is raised from diaphragm 50 in the lowermost layer, as is in FIG. 2, so that plate member 41, piece 56 of junction member 44 and piece 57 of junction member 45 are perpendicular to diaphragms 46 to 50. In this expanded state, according to the stiffness of plate member 41, the complete assembly remains rigid substantially in the direction from the top to the bottom of FIG. 1.

The hollow core according to the invention may be used as buiding elements, such as, an inner wall, a ceiling, a partition, a wall curtain, a counter and a door, etc., as furniture elements, such as, a table top, a desk board, and a front board of a wardrobe, etc., as a surveying board, as a drawing board, as an ice-box, as a cabinet or a pingpong table and the like. When appropriate materials are used for the hollow cores, the complete assembly of the hollow core prepared according to the invention provides extremely light weight and more stiffness than a conventional hollow core, and, in addition, the complete assembly possesses a high degree of compressive strength, flexural rigidity and adiabatic efficiency. Moreover, the complete assembly of the invention can be conveyed and stored in the folded state, therefore the transport capacity and the storing ability are highly improved. Especially, when heat-resisting materials are used for the hollow cores, in harmony with the heat-resistivity of the plate member the complete assembly can acquire a high degree of heat insulation.

What is claimed is:

1. An expansible hollow core comprising in combination:
    (a) at least three spacedly superposed diaphragm members, each of said members having two opposite face portions at least one face portion of each member being opposite a face portion of an adjacent diaphragm member, opposite face portions constituting a pair of face portions;
    (b) a plurality of connecting sheet members interposed between each of said pairs, each connecting sheet member including a plate member having two opposite faces, two junction members attached to a respective one of the plate member faces, and two flange portions integrally connected to respective ones of the junction members, said flange portions being hingedly movable relative to said plate member about respective axes extending in a common direction, each flange portion having a mounting face extending away from the corresponding axis; and
    (c) fastening means fastening the two flange portions of each connecting sheet member to the opposite face portions of the corresponding pair of diaphragm members, each member of said pair of diaphragm members being movable toward and away from the other member of the pair when the flange portions of the interposed connecting sheet members move about the respective axes.

2. A core as set forth in claim 1, wherein said plate member is of relatively rigid material, and said junction members are of relatively pliable material.

3. A core as set forth in claim 1, wherein said web portion is of substantially rectangular cross section, and the thickness of said web portion is substantially greater than the thickness of each flange portion.

4. A core as set forth in claim 1, wherein each flange portion is interposed between the corresponding web portion and the diaphragm member to which the flange portion is fastened by said fastening means.

References Cited by the Examiner
UNITED STATES PATENTS
1,963,609  6/1934  Balduf et al.
2,750,313  6/1956  Schwartz et al. -------- 52—406
2,850,206  9/1958  Pasjack ----------- 229—15 X ALEXANDER WYMAN, *Primary Examiner.*
E. M. BERGERT, *Examiner.*
R. A. FLORES, R. J. CARLSON, *Assistant Examiners.*